R. J. HUTCHINSON & A. B. GRINDROD.
SPEED INDICATOR.
APPLICATION FILED OCT. 25, 1909.
983,496.
Patented Feb. 7, 1911.
5 SHEETS—SHEET 4.
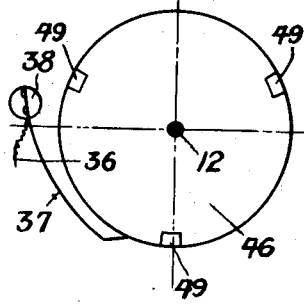
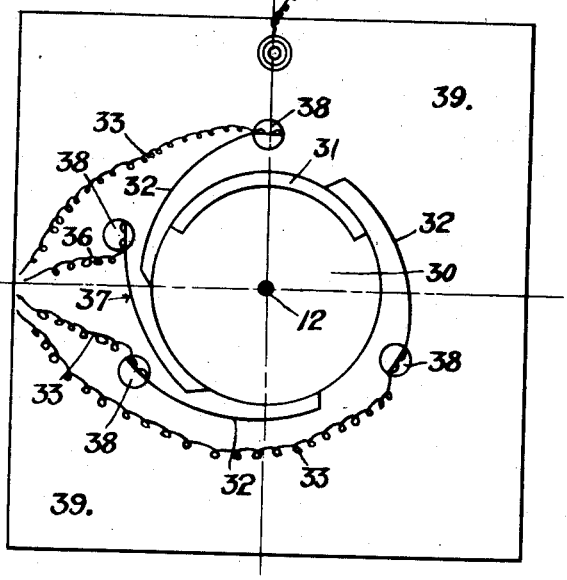
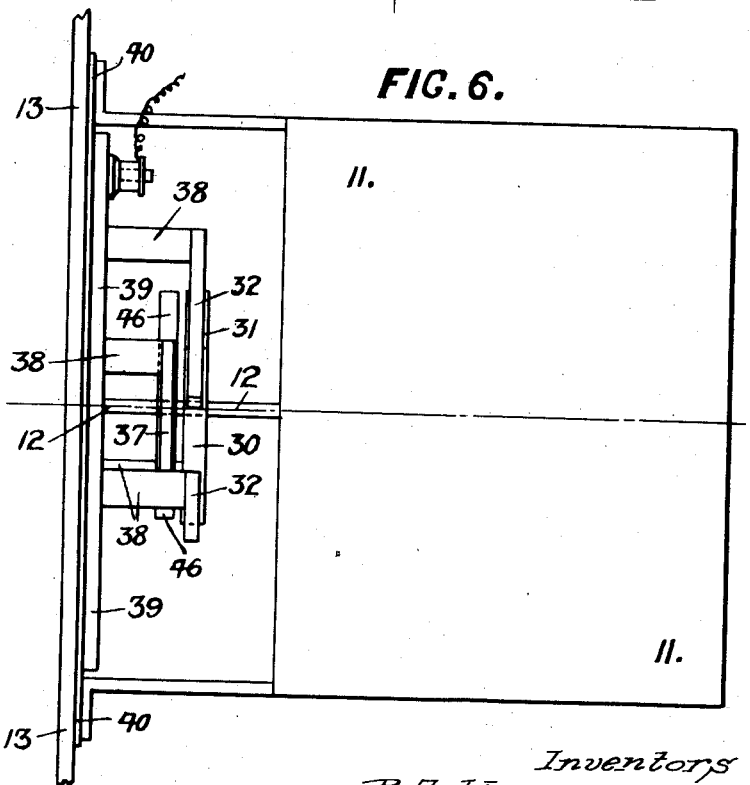
Witnesses
R. Goodstein
M. Schmid
Inventors
R. J. Hutchinson
A. B. Grindrod
by B. Singer
Atty R. J. HUTCHINSON & A. B. GRINDROD.
SPEED INDICATOR.
APPLICATION FILED OCT. 25, 1909.

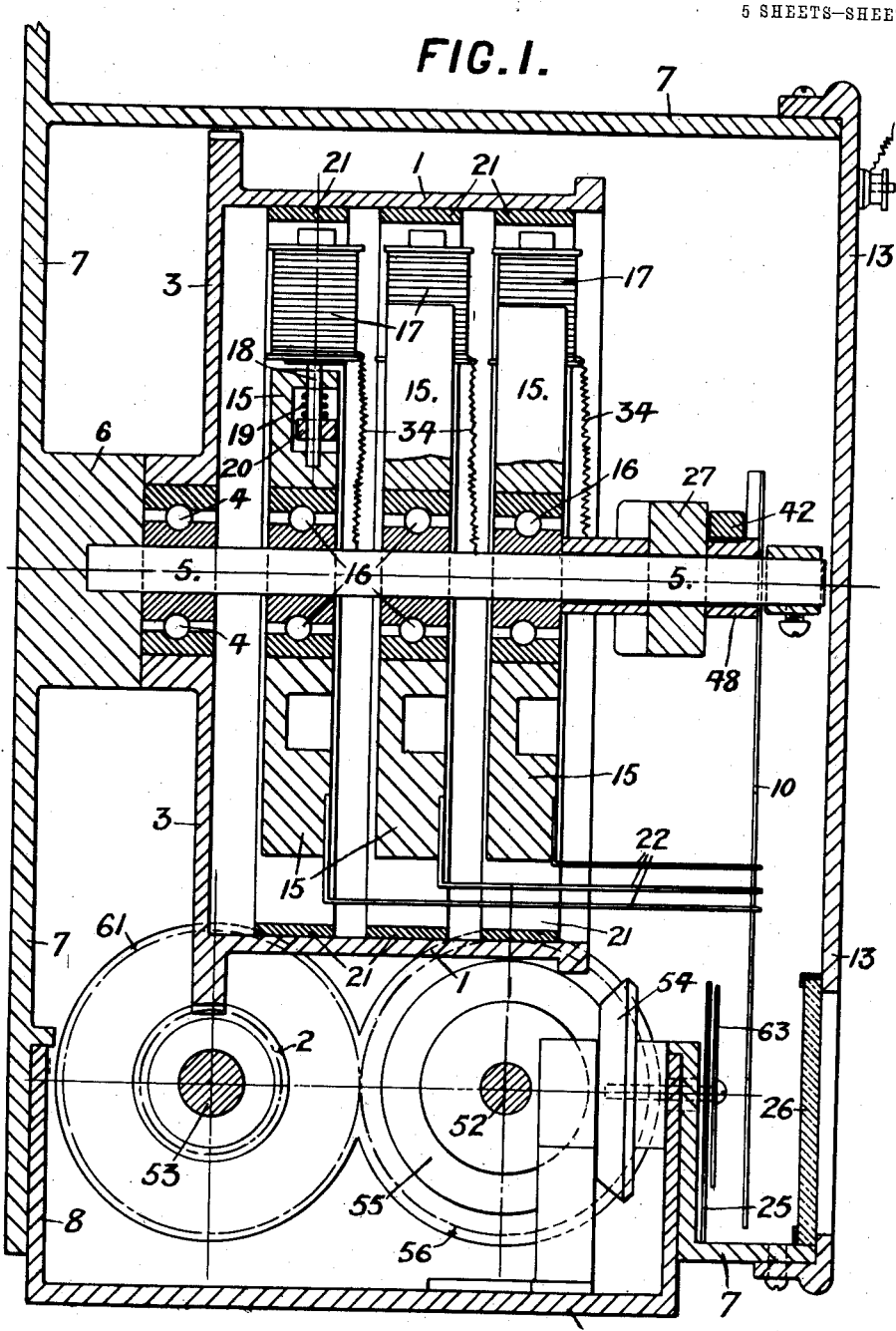

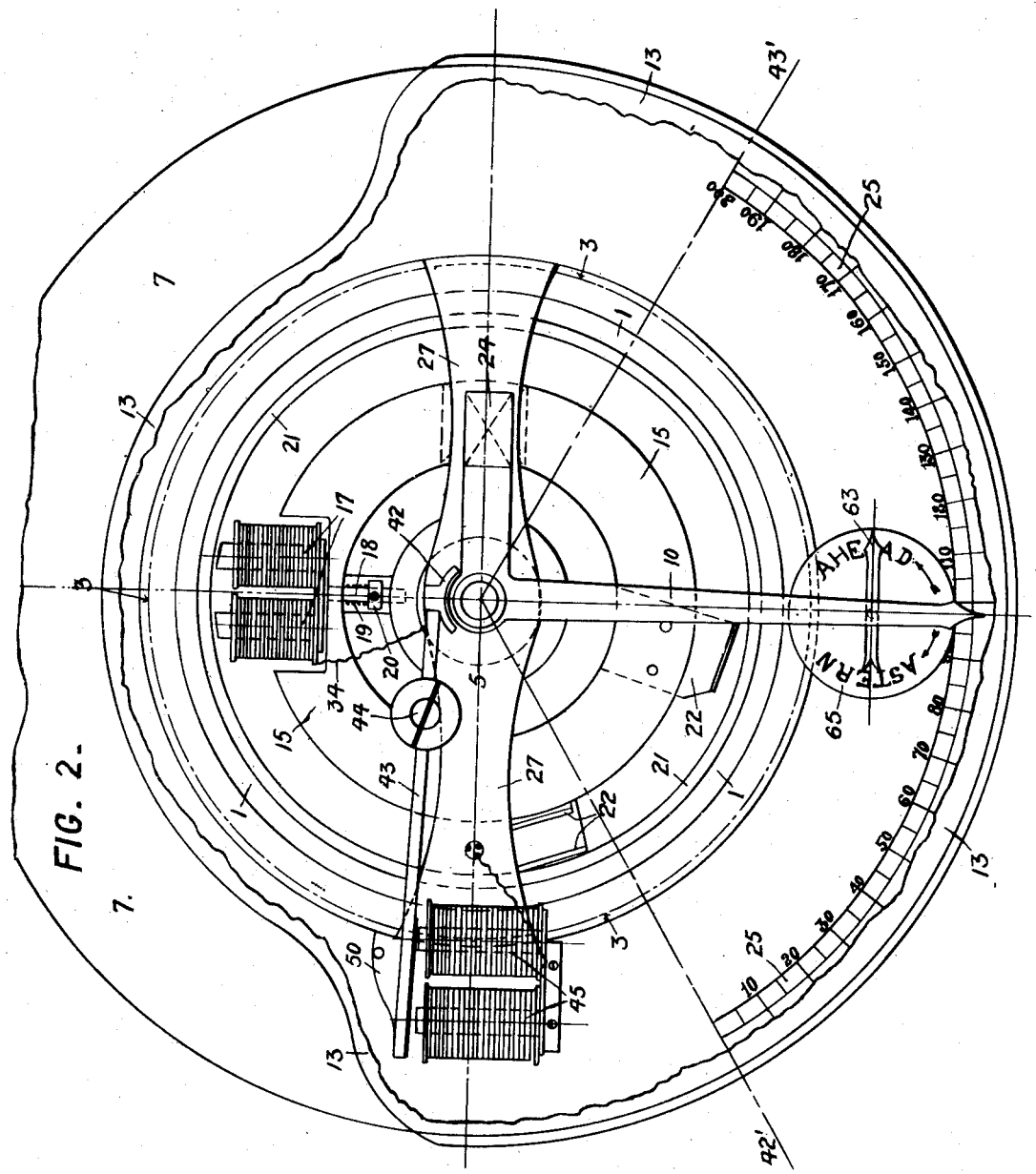

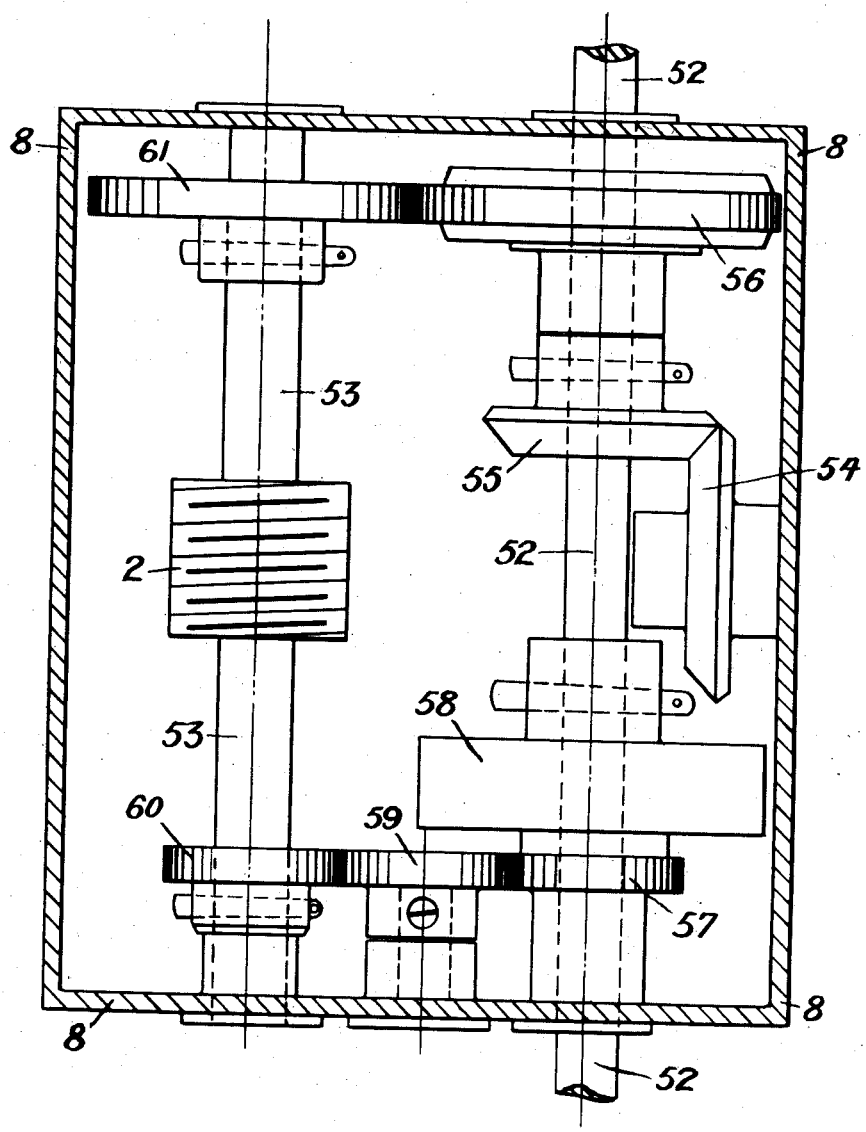

983,496.

Patented Feb. 7, 1911.

5 SHEETS—SHEET 5.

Witnesses
F. Stapel
A. J. Moran

Inventors
Richard John Hutchinson
Albert Barton Grindrod
by G. J. Singer
Att'y

UNITED STATES PATENT OFFICE.

RICHARD JOHN HUTCHINSON, OF BIRKENHEAD, AND ALBERT BARTON GRINDROD, OF ROCK FERRY, ENGLAND.

SPEED-INDICATOR.

983,496.  Specification of Letters Patent.  Patented Feb. 7, 1911.

Application filed October 25, 1909. Serial No. 524,466.

*To all whom it may concern:*

Be it known that we, RICHARD JOHN HUTCHINSON and ALBERT BARTON GRINDROD, subjects of the King of England, residing, respectively, at Birkenhead and Rock Ferry, in the county of Chester, England, have invented new and useful Improvements in Speed-Indicators, of which the following is a specification.

This invention has reference to apparatus for indicating the speed at which shafts of engines or machinery, or the like, are revolving or moving; and for convenience, it will be described as applied to the indication of the speed at which engine shafts are revolving.

The chief object and effect of the present invention is to provide an apparatus of this kind, which, while being accurate in its indications when new, or freshly adjusted or set, is not so liable to cease to be so, and become defective after some use and time, but will indicate without error—either in a plus or minus direction—for relatively great lengths of time, and after much use, without attention or adjustment; and also to provide an indicator which in itself is compact and simple, in addition to the characteristics above referred to.

In the following description of apparatus for indicating the speed at which shafts of engines, machinery, or the like, are revolving or moving, the improvements hereunder are comprised; and in the accompanying drawings, in connection with which the description is made, these improvements are illustrated.

Figure 7:
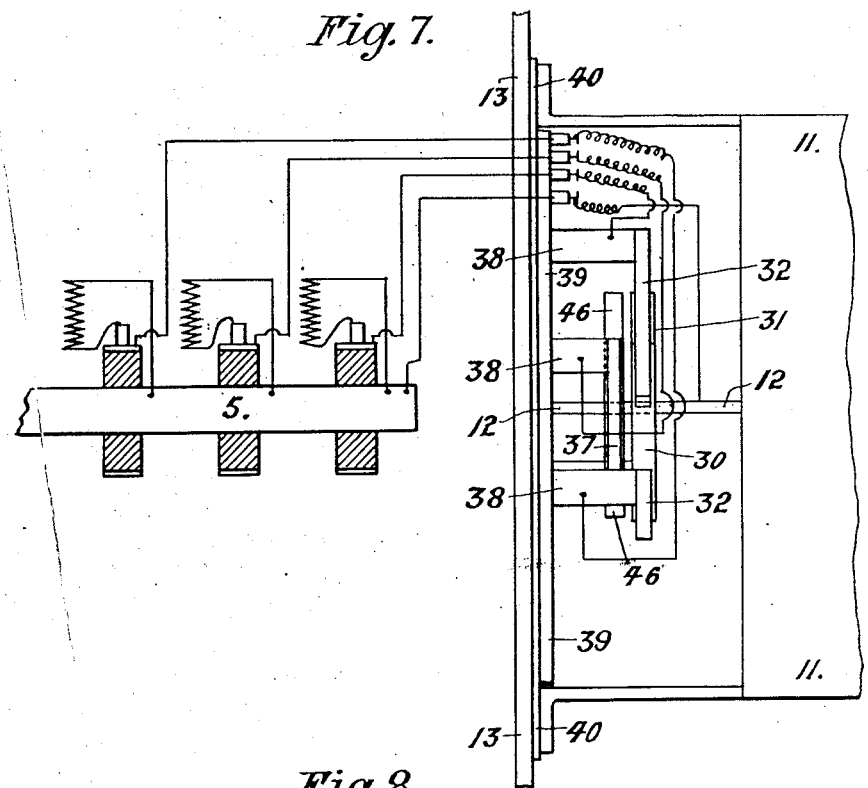
Figure 8:
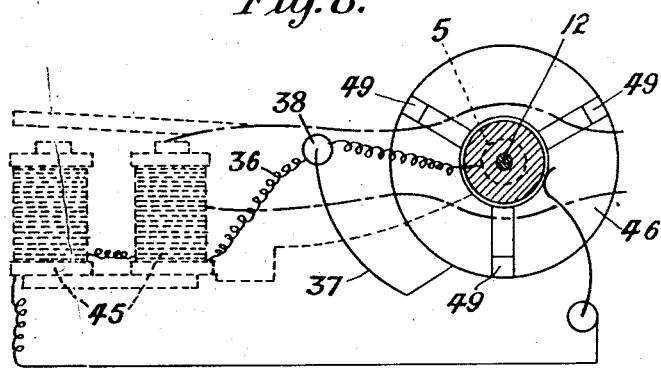

In the drawings, Figure 1 is a longitudinal elevation in section; Fig. 2 is a front view; and Fig. 3 is a plan of the gearing; while Figs. 4 and 5 are views of the contact breakers; and Fig. 6 is a side elevation of a clock mechanism for operating same. Figs. 7 and 8 are diagrammatic illustrations of the electrical connections hereinafter referred to.

Motion is transmitted from the part whose speed, *i. e.*, revolution per unit of time is to be indicated, to a part in the indicator, which is revolved; and in the construction shown in the drawing, this part consists of a drum 1; and its rotation is effected through a worm wheel 2 driven from the part, the speed of which is to be indicated, as hereinafter described.

The drum 1 is framed on the disk 3, and is carried by ball bearings 4, from the central fixed spindle 5, supported at one end in a boss 6 in the chain case 7 of the apparatus, and at the other by the cross bearing 27.

The worm 2, and its driving gear, are mounted in the lower gear box 8, fitting into the lower part of the casing 7.

The drum 1 is continuously revolved, and motion is transmitted from it to parts which are vibrated about a center or pivot, namely, about the shaft 5, and which act upon the indicating pointer 10—or its equivalent. That is, these parts are vibrated from this continuously revolving drum, by causing such parts, at certain regular intervals of time, to make connection with, and be disconected from same, so that they are revolved, when connected, a partial revolution and then disconnected, and move back to their normal or zero position by gravity or other means; and these connecting connections are effected through a timekeeping motor mechanism, such as a clock spring motor mechanism, marked 11, and shown in Fig. 6, the driven arbor or spindle of which is designated 12. This clock is fixed on the face plate 13, which fits over the casing 7 of the apparatus; and the connecting and disconnecting connections are effected through an electrical contact making and breaking means shown in Figs. 4, 5, and 6, driven by the clock. Or, in some cases, this connection and disconnection may be effected from the time-keeping motor, through mechanical engaging and disengaging devices operated thereby.

In the form of parts illustrated in the drawings, the vibrating parts consist of three separate wheels 15, carried by roller bearings 16 on the central fixed spindle 5, on which they revolve, and each carrying an electro-magnet 17, upon a spindle 18, which projects into the wheel radially and is free to move in and out thereon; it being normally pressed inward toward the axis by a spring 19, acting on a collar 20 on it. These magnets are adapted to be energized and deënergized by the contact make and break device above referred to, which is revolved by the clock or time-keeping mechanism 11, so that they will, alternately, and in sequence, when energized, be moved toward a ring armature 21 on the interior of the revolving drum 1; and when so moved, make connection with same, and thereby be revolved, and so revolve their carrier wheels 15 for a portion of a revolution, which, through suitable motion transmitting means or devices—namely the tongues 22—act upon the indicator pointer 10, which is fixed on the spindle 5.

By the successive movements and actions of the magnets 17, and their wheels 15, through the revolving drum or disk 1 and the time-keeping motor 11, the indicator 10 will be moved a certain distance around the axis or spindle 5, or allowed to return to positions, according to the distance the said magnet wheels 15 are moved—which distance will vary according to the rate at which the drum 1 is being revolved. The return movement of the pointer 10 is effected by a balance weight 24, carried by it, so that it will move back from any position, when freed by the tongues toward zero slowly. The magnet wheels 15 do not rotate with the drum until they are connected to it by the electro-magnets which attach themselves to the drum for a constant unit of time, and when released return to their normal starting position by gravity of the drum; which is always revolved in one direction no matter in what direction the primary shaft of the apparatus, to which motion is transmitted, is moving. The pointer 10 moves over the scale 25, which is seen through the window 26 in the lower part of the front plate 13. The indications thus produced and given are intermittent, and correspond with the aforesaid period of time of action by the said magnet wheels 15, and the number of them.

With regard to the particular apparatus shown, it will be seen that the tongues 22 are so attached to the wheels 15, as to pass one another, and engage and propel the indicator 10; and in their zero or starting position, these arms or tongues rest against the cross bearing bar 27 of the shaft 5.

The contact making and breaking device shown consists of a metal wheel 30, which is mounted on and revolved by the driven arbor 12 of the clock 11, and has upon it an insulation strip 31 around a portion of its periphery; and in connection with the periphery of this disk, there are a plurality of suitably spaced spring contacts 32, namely 3, and connected electrically by the wires 33 to the several magnets 17, respectively.

In the case of there being three wheels or arms 15, as in the case shown in the drawings, the spring contact arms 32 will be spaced preferably at 120° from each other; and the return current from these magnets is through the wires 34 connected up with the shaft spindle 5, which is connected up by a wire 36 with the return spring contact 37, which is in continuous contact with the metal disk 46.

The connections between the several parts of the clock-work driven and power driven mechanisms are exhibited in Figs. 7 and 8, the reference on these parts being the same as in the other views.

The various contacts are carried by projections 38 from the plate 39, which is suitably connected up with the battery or other electrical service; and this plate 39, and the clock 11, are insulated from the front plate 13 by the insulation 40.

The contact wheel 30 is revolved at a constant rate, and makes the required number of breaks and makes for a suitable period of time.

During the breaks of the respective contacts, the magnets 17 of the wheels 15, no longer hold onto the ring armatures 21, and they return to their normal or starting position, due to their own weight or balance.

The greater the speed of the drum 1, the farther will this drum carry the magnets 17, and therefore the pointer 10, around, in the given period of time during which the said magnets 17 are energized, which will show a corresponding increment of speed. And, vice-versa, the slower the speed, the less reading and indication would be given by the pointer upon the speed dial 25.

With regard to the frequency of action of the break and make contact device, the clock 11 may drive the contact wheel 30 at one revolution per minute, and by the arrangement of the circumference of the wheel 30, and the contacts, an electric circuit through the magnets 17 is made for forty seconds, and a break for twenty seconds; and during these twenty seconds, the magnets are out of connection with the drum 1, and so their wheels 15 return during these periods. That is, during the one-third of twenty seconds, each of them, by their balance, return to their starting position, namely, the point where the back of the tongues come in contact with the cross bearer 27.

Supposing the driven shaft were running at the rate of 200 revolutions per minute, and the worm 2 at the same speed, then 133⅓rd revolutions will be made in forty seconds, which equals the time the magnets are in contact with the drum 1 in one minute; and, therefore, the drum 1 will be so geared that 133⅓rd revolutions of the shaft will carry the drum 1 from the position 42, namely, the zero position, to the position 43.

In connection with the spindle 5 and the pointer 10, there is an electrical brake consisting of the brake block 42 carried on an arm, mounted on a pivot 44, and operated from the outer end which constitutes an armature, by the electromagnet 45, the action of which is controlled by the contact making disk 46, mounted on the clock driven spindle 12, and working in connection with the spring contact 37, which is suitably electrically connected with the winding of the magnets 45. The brake block 42 works on the hub 48 of the pointer 10 which is loose on the shaft 5. The disk 46 is of insulating material, and has within its edge short metal pieces 49 which are so disposed in it, in relation to the contact making brake device 30 and its contacts, that when the pointer has been moved to a certain position by one of the tongues 32, the magnets 45 will be energized, and they will pull the brake off the bar 43, while at other times it will be on, being pulled upward by a spring 50. Thus the brake will always be on while the arm is moving forward, and only off a short time after the movement by the tongues, so as to allow the pointer to move back, when the speed of the recorder is diminished.

With regard to the mechanism for transferring motion to the worm 2 of the mechanism, and the apparatus generally, it is transmitted in such a manner that it will act as required, no matter in which direction the driving shaft may be running. The means for effecting this consists of a pair of parallel spindles mounted in the box 8, and sets of wheels; namely a primary driving shaft 52, and a secondary shaft 53 driven therefrom. At the two ends of the shaft 52 there are toothed pinions or wheels, 56, 57, the wheel 57 having connected with it a free wheel device 58 of any known simple kind which grips when the shaft 52 is revolved in one direction; and the motion is transferred through this mechanism, and through an idle pinion, to another pinion 60 on the shaft 53; while when the shaft 52 is revolved in the opposite direction, this free wheel device 58 is free on the shaft; and then the other wheel 56, which also has a free wheel mechanism in it, is driven by the grip of this mechanism, and so drives the wheel 61 on the shaft 53, while when the shaft 52 is revolving in the opposite direction, this free wheel device on the wheel 56 is free and is revolved idly by the wheel 61. Hence no matter in which direction the primary driving shaft may be revolving, the wheel 2 will be revolved in the same direction.

A direction indicator 63, is provided opposite the window 26, and is driven from the shaft 52 by bevel wheels 54, 55. A dial 65 is provided behind the pointer 63, bearing the direction words "Ahead" and "Astern".

What is claimed is:—

1. In apparatus for indicating the speed of revolving or moving parts of engines or machinery, a part revolved by the engine or machinery, the rate of movement of which it is desired to indicate; an indicating device; a plurality of parts having indicating device operating means connected with them; a plurality of electro-magnets for connecting and disconnecting each of said plurality of parts by which they are carried with the said moving part at regular intervals of time; a moving electric switch connected with said magnet devices, for bringing the several magnets in their order into circuit for a predetermined length of time, and then to open said circuit, whereby they are caused to make a partial revolution, and then move back to the normal zero position; and a time regulating clock-work mechanism for rotating the switch; substantially as set forth.

2. In apparatus for indicating the speed of revolving or moving parts of engines or machinery, the combination of a part revolved by the engine or machinery; a plurality of rotatable parts carrying electro-magnetic devices adapted to alternately make connection with, and be disconnected from said moving part at regular intervals of time, and be moved thereby; a time-keeping motor; a contact making and breaking device operated by said motor, by which the said electro magnetic devices are *seriatim* energized and deënergized; a pointer device operated by said magnet carrying parts, when said magnetic devices engage the primary moved part; substantially as set forth.

3. In apparatus for indicating the speed of revolving or moving parts of engines or machinery, a part revolved by the engine or machinery, and a plurality of electro-magnetic devices mounted on a common axis on carriers thereon, and within the said revolved part, and each having a device connected with it, which operates in connection with the pointer or indicator; substantially as set forth.

4. In apparatus for indicating the speed of revolving or moving parts of engines or machinery, the combination of a plurality of revolving parts, 15, each carrying an electro-magnet 17, said parts 15 with the magnets being balanced, and each having a tappet device 22; and a pointer mounted co-axially with the revolving parts, and adapted to be acted upon and actuated by said tappets 22; substantially as set forth.

5. In apparatus for indicating the speed of revolving or moving parts of engines or machinery, a part revolved by the engine or machinery; an indicating device; a plurality of parts having indicator device operating means connected with them; electro-magnetic devices adapted to make connection between each of said plurality of parts, and said moving part, and to disconnect same; a magnetically-operated brake device operating in connection with said indicator device; and a moving switch device for closing and opening the circuits of said electro-magnetic devices; substantially as herein set forth.

6. In apparatus for indicating the speed of revolving or moving parts of engines or machinery, the combination of a spindle 5; a plurality of balanced disks 15 mounted thereon; an electro-magnet 17 mounted and adapted to move radially on each of said disks, a hollow cylinder 1, mounted co-axially on the axis 5, and revolved by the machinery or engine, and within which said disks and magnets are disposed; tappets 22 mounted on said disks 15; and a pointer 10 mounted on the said axle 5, and adapted to be engaged by said tappets when they move; substantially as set forth.

In testimony whereof we have signed our names to this specification in the presence of two subscribing witnesses.

RICHARD JOHN HUTCHINSON.
ALBERT BARTON GRINDROD.

Witnesses:
LOUIS A. GEDDES,
H. WILLIAMS.